United States Patent [19]

Urbanic et al.

[11] 4,101,751
[45] Jul. 18, 1978

[54] APPARATUS AND METHOD FOR INERT GAS ARC WELDING

[75] Inventors: John M. Urbanic, Pittsburgh; Burney A. Major, Spring Church, both of Pa.

[73] Assignee: Aluminum Company of America, Pittsburgh, Pa.

[21] Appl. No.: 803,022

[22] Filed: Jun. 3, 1977

[51] Int. Cl.² .............................................. B23K 9/16
[52] U.S. Cl. ...................... 219/74; 219/75; 219/121 P
[58] Field of Search ................ 219/74, 75, 130, 121 P

[56] References Cited

U.S. PATENT DOCUMENTS

| | | | |
|---|---|---|---|
| 1,904,104 | 4/1933 | Tobey et al. | 219/75 |
| 3,053,968 | 9/1962 | Gorman et al. | 219/74 |

*Primary Examiner*—J. V. Truhe
*Assistant Examiner*—J. H. Bouchard
*Attorney, Agent, or Firm*—Daniel A. Sullivan, Jr.

[57] ABSTRACT

An arc welding torch terminates in a gas cup open at one end through which an electrode projects. Inert gas is introduced under pressure at the other end of the gas cup and flows past and through a gas diffuser disposed in said gas cup. The diffuser is spaced from the inner wall of the gas cup, and a portion of the gas flows axially parallel to the central axis of the gas cup. The diffuser has a set of passageways to form and direct columns of gas in an outward direction, and another set of passageways to form and direct columns of gas in an inward direction. The diffuser is axially and angularly adjustable to vary the pattern of gas discharge with relation to the arc and to control the contour of the weld bead.

12 Claims, 4 Drawing Figures

APPARATUS AND METHOD FOR INERT GAS ARC WELDING

BACKGROUND OF THE INVENTION

The present invention relates to inert-gas arc welding, and more particularly, to a method and apparatus for applying a shielding gas in the welding operation.

In the conventional arc welding processes, such as either the TIG (tungsten inert-gas type) or the MIG (consumable inert gas type), the heat generated by the electrical arc is utilized to reduce the metal material to be joined to a molten state to effect fusion between the parts to be joined. Most metals in a molten state will react with atmospheric gases, usually resulting in an unstable arc and a poor weld. In one known process for stabilizing the arc, when welding aluminum plate or the like, a shielding gas, which is normally argon or helium, is utilized to surround the arc and exclude atmospheric gases from the weld area and prevent oxidation of the molten metal which will ultimately form the weld. In addition, the gas provides a low resistance path for the arc and the gas ions provide a cleaning action by bombardment of the metal surfaces to be welded.

Various problems have existed in the application and utilization of the shielding gas. For example, optimum cleaning action was not achieved. Weld bead contours were not as controllable as desired. A very close torch cup to work distance had to be maintained to prevent disruption of the gas pattern by external forces. Moreover, the efficiency of the gas consumption was less than desired. In addition, when welding in vertical position, the weld metal flow and solidification patterns were less than optimum.

An example of a plasma generating torch is shown in U.S. Pat. No. 3,604,889 but in such patent the gas, instead of being directed in columns, is cone-shaped and is concentrated into a stream which penetrates the arc externally of the torch. Moreover, there is not axial or angular adjustment of the stream.

SUMMARY OF THE INVENTION

A gas cup substantially closed at one end and open at the other has an electrode disposed therein. An inert gas entrance means is disposed remote from the open end. A diffuser in accordance with the present invention is mounted to direct the gas in a predetermined manner relative to the arc and the pieces to be welded, in accordance with the present invention. The diffuser is adapted to form and direct columns of the inert gas in an outwardly flaring direction from the central axis of the electrode and to form and direct other columns of the inert gas towards the longitudinal central axis of the electrode. The diffuser also coacts with the body of the torch to form a cylindrical column of gas which surrounds the directed columns of gas to provide a protective shield for the directed columns.

The diffuser is adjustable axially and/or angularly with reference to the electrode, whereby the gas columns may be varied for the most efficient operation.

By the foregoing arrangement, improved cleaning patterns provided by the cleaning action of gas ions bombarding the metal surface has been achieved, and improved weld bead contours have been obtained. The torch cup to work distance is not as critical, and the disruption of the gas pattern by external forces is reduced. The gas consumption for a given torch nozzle size and set of welding parameters has also been reduced by the improved utilization of the gas to provide optimum effect. Moreover, improved weld metal flow and solidification patterns have been obtained when welding in the vertical position.

DESCRIPTION OF THE PREFERRED EMBODIMENTS

Figure 1:
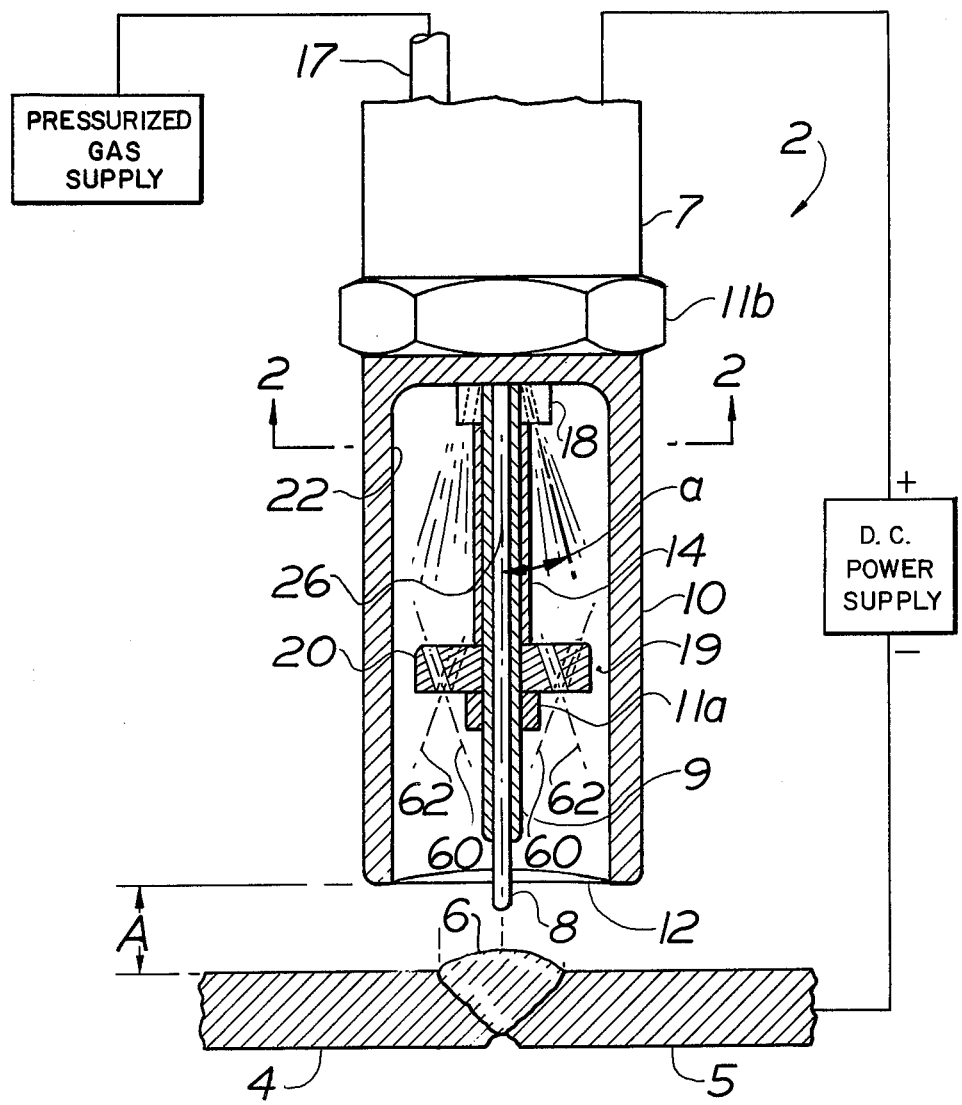
FIG. 1 is a sectional elevation view of a welding torch in accordance with the present invention and an elevational view of the work piece.

Referring to FIG. 1, there is illustrated generally at 2 a welding torch embodying the present invention for welding together the abutting edges of plates 4 and 5. More particularly, the torch includes a body 7 which may be operably connected in a welding assembly (not shown) as well known in the art. The torch body supports an electrode 8, which extends through a contact tube 9 into a gas cup 10 mounted adjacent the outer end of the torch body 7. The electrode and the work pieces are connected to a suitable electrical power source, as well known in the art, to produce an arc, between its outer end and the work pieces. As shown, the gas cup is secured to the body as by a retainer nut 11b, and has an open outer end 12 disposed in confronting relation to the abutting edges of the work pieces 4 and 5. Shielding gas flows into the torch through a conduit 17 and into the cup through an inlet 18. A diffuser 20 is disposed within the cup and outwardly of the inlet 18 in the path of the shielding gas to provide directionalized columns of gas around the arc during the welding operation.

Figure 2:
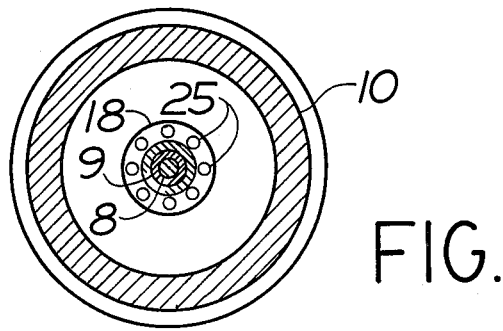
FIG. 2 is a horizontal sectional view taken along the lines 2—2 of FIG. 1.

Referring now to FIGS. 1 and 2, the gas cup is generally tubular in configuration, having a generally circular bore 22 of generally uniform diameter, such as 1.75 inches, throughout its length between the gas inlet 18 and the outer end 12. The contact tube 9 extends generally axially through the bore 22 having an outside diameter which is considerably less than the bore 22, being approximately ⅜ inches. The contact tube has an interior diameter sufficient to accomodate an electrode 8 of suitable diameter, such as 5/32 inches, for carrying out the welding operation. Preferably, the contact tube extends for substantially the full length of the gas cup terminating slightly short of the outer end 12. Although in the particular form shown, the welding torch is designed for use with a consumable electrode, it is to be understood that it could be arranged for use with an electrode of the non-consumable type.

Referring again to FIGS. 1 and 2, the shielding gas inlet 18 is provided with a plurality of elongated passages 25 for directing the shielding gas into the gas cup in a direction toward the outer end 12. As shown in FIG. 2, the passages 25 are uniformly spaced with respect to the central axis 26 of the contact tube and extend generally angularly outwardly, in a direction toward the outer end 12, whereby the gas will be sprayed downwardly and outwardly toward the walls of the bore 22.

Figure 3:
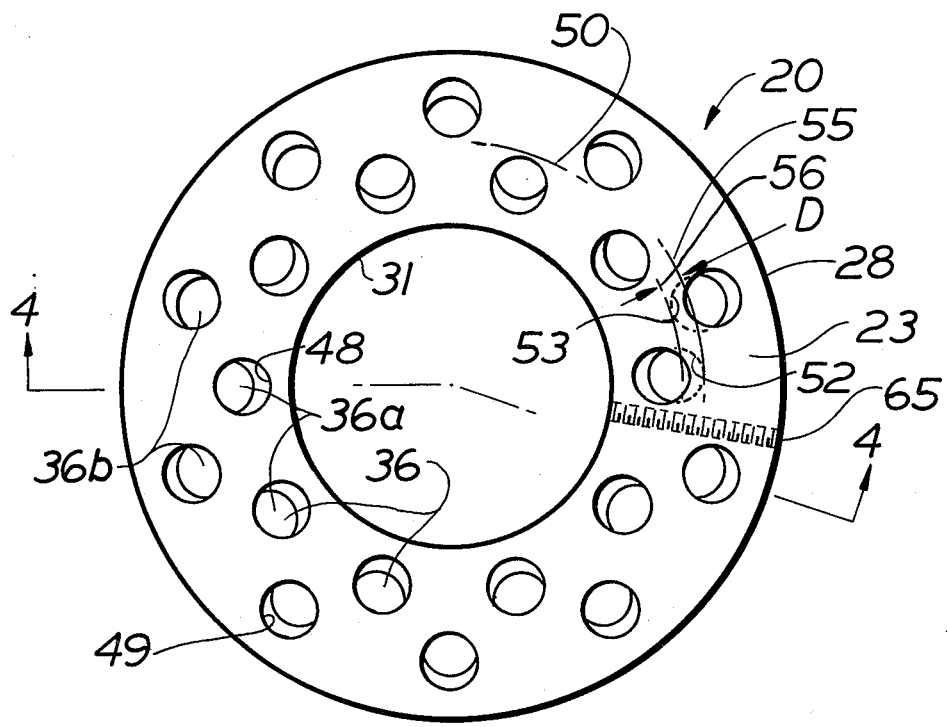
FIG. 3 is a top plan view of the diffuser element in accordance with the present invention.

As best seen in FIG. 3, the diffuser 20 comprises a generally flat, collar-like body 23 which is defined exteriorly by a generally circular outer wall 28. The body 23 includes a generally central opening 30 of circular configuration, which is defined by an inner wall 31 disposed generally concentrically with respect to the outer wall 28. The diffuser 20 has a planar top 32 and bottom 33 surface being adapted to slidably receive the contact tube 9 therethrough, as seen in FIG. 1.

As best seen in FIG. 3, the body 23 includes passageway means 36 for directionallizing the flow of shielding gas. More particularly, the passageway means 36 includes one set, or inner set, of passageways 36a disposed adjacent the inner wall 31 for directing columns of shielding gas in one direction, and another set, or outer set, of passageways 36b disposed adjacent the outer wall 28 for directing columns of the shielding gas in another direction. Preferably, the passageways 36a and 36b extend between the top surface 32 and bottom surface 33 and are disposed in staggered relations to one another and around the axis 26. Although any number of passageways 36 may be provided, it is preferred that the body 23 includes at least twenty passagesways in order to provide an optimum gas flow pattern, for reasons which will become more apparent hereinafter.

Figure 4:
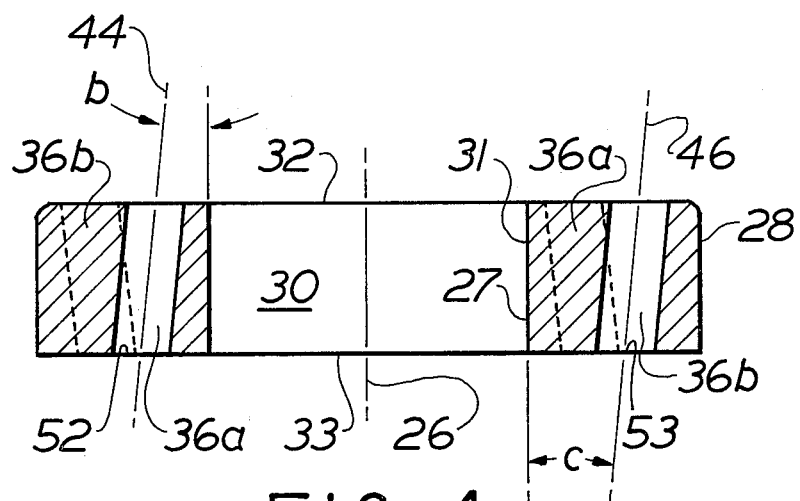
FIG. 4 is a horizontal sectional view taken along the line 4—4 of FIG. 3.

As best seen in FIG. 4, the passageways 3a forming the inner row have their lengthwise axes, such as at 44, extending generally angularly outward, in a direction from the top surface 32 toward the bottom surface 33, such as an angle "b" of approximately 6° with respect to axis 26. As seen in FIG. 4, the passageways 36b forming the outer row have their lengthwise axes, such as at 46, extending generally angularly inward in a direction from the top surface 32 to the bottom surface 33, such as at an angle "C" of approximately 6° with respect to the axis 26. In this manner, the columns of gas flowing from the passageways 36a of the inner row are directed outwardly, as indicated at 62, (FIG. 1), whereas the columns of gas flowing from the passageways 36b of the outer row are directed inwardly, as indicated at 60, to a precise location, with respect to the electrode 8, whereby the arc and the weld puddle will be shielded from contact with and contamination by the surrounding ambient air.

As can be seen in FIG. 3, the openings 48 of the passageways 36a adjacent the top surface 32 are disposed radially inwardly of an imaginary circular line 50 which extends generally centrally between the outer wall 28 and the inner wall 31, whereas the openings 49 of the passageways 36b adjacent the top surface 32 are disposed radially outwardly of line 50. On the other hand, the openings 52 and 53 of the passageways 36a and 36b adjacent the bottom surface 33 are disposed in radially overlapped relationship, such as by the distance D in FIG. 3 between the imaginary lines 55 and 56 which are generally concentric to the line 50.

The diffuser 20 is generally circular in configuration and may be made of any suitable material such as copper or the like. The diffuser has a central opening 27 for slidable mounting on the contact tube 9. The diffuser can be axially adjusted inwardly positioned by a selective length spacer element 14 and held in place against axially outward movement by nut 11a which is threaded on the tube 9. The diffuser can be angularly adjusted by rotation and then secured in place by a set screw in a threaded opening 65 in FIG. 3.

By proper selection of the axial location of the diffuser 20 relative to the length of the gas cup 10 and the angular inclination of the passageways 36, the gas can be selectively directed in columns to achieve the desired shielding pattern. Such columns are enclosed by a cylindrical column of gas which flows through the space 19 between the outer wall of the diffuser and the inner wall of the gas cup. In the preferred embodiment, the electrode 8 projects beyond the gas cup, and the positioning of the diffuser 20 relative to the electrode is such that the gas columns propelled through the outer row of passageways 36b are directed toward the arc, and the gas columns propelled through the inner rows of passageways 36a pass just radially inwardly of the end 12 of the cup 10 and join with the cylindrical column of gas flowing between the diffuser and the cup to provide a broad gas shield for the arc and the weld bead 6.

In the preferred embodiment, the gas while emitting from the diffuser 20 in one set of alternatingly spaced columns directed outwardly by openings 36a and passing by but not intersecting the alternatingly spaced columns directed inwardly from openings 36b eventually disperse at and around the weld bead to provide the desired shielding and cleaning effect. At such location, the dispersed gas from the passageway 19 between the diffuser 20 and the inner wall of the gas cup 10 also adds to the overall shield.

By the foregoing arrangement, not only is the arc effectively shielded from the atmospheric oxygen, but the shielding gas also provides an improved cleaning effect. The gas cup distance A between the cup and the work pieces 4 and 5 becomes less critical in shielding against disruption of the gas pattern by outside forces, and greater efficiency in the use of the gas results. The weld bead contour can be better controlled, and when welding in a vertical position, the weld metal flow and solidification pattern are improved.

We claim:

1. An arc welding device including,
   an elongated cup being substantially closed at its distal end and being substantially open at its proximal end,
   inlet means adjacent the distal end of the cup for introducing gas into the cup,
   electrode means disposed inside said cup and extending axially thereof,
   diffuser means disposed partway along the axis of said cup between said inlet means and said open end of the cup,
   said diffuser means having at least one set of passageways therein having their axes inclined away from the longitudinal central axis of the cup, and
   at least one other set of passageways having their axes inclined toward said longitudinal central axis,
   the two sets of passageways alternating with one another for creating two sets of gas columns passing by but not intersecting one another.

2. An arc welding device in accordance with claim 1 wherein,
   said one set of passageways is disposed radially inwardly of said other set of passageways.

3. An arc welding device in accordance with claim 2 wherein,
   said one set of passageways and said second set of passageways are disposed concentrically of the longitudinal central axis of said cup.

4. An arc welding device in accordance with claim 3 wherein,
   said electrode means is disposed centrally of said cup.

5. An arc welding device in accordance with claim 1 wherein the outer surface of said diffuser means and the inner wall of said cup provide a passageway axially of the cup and exteriorly of the diffuser means.

6. An arc welding device in accordance with claim 1 wherein said electrode projects beyond the cup.

7. An arc welding device in accordance with claim 1 wherein, said diffuser means is axially positioned within said cup a predetermined distance and, said one set of passageways is inclined at a predetermined angle whereby gas projected through said passageways is directed generally adjacent the proximal end of the inner surface of the cup.

8. An arc welding device in accordance with claim 7 wherein, the longitudinal central axes of the other set of passageways are inclined to intersect beyond the electrode.

9. An arc welding device in accordance with claim 1 including, pressure means to project the gas through said inlet under pressure.

10. A device in accordance with claim 9 including, electrical means to produce an arc adjacent the tip of the electrode means.

11. A method of arc welding comprising, generating an electric arc, directing a quantity of inert gas in the form of columns in a direction inwardly toward said arc, and directing another quantity of inert gas also in the form of columns in a direction outwardly from said arc, with the inwardly directed columns alternating with the outwardly directed columns, with the columns passing by but not intersecting one another.

12. A method of arc welding in accordance with claim 11, including directing a third quantity of gas in a direction generally parallel to the longitudinal axis of said arc.

* * * * *

UNITED STATES PATENT AND TRADEMARK OFFICE
CERTIFICATE OF CORRECTION

PATENT NO. : 4,101,751
DATED : July 18, 1978
INVENTOR(S) : John M. Urbanic et al.

It is certified that error appears in the above-identified patent and that said Letters Patent are hereby corrected as shown below:

Col. 3, line 23    Change "3a" to --36a--.

*Signed and Sealed this*

*Nineteenth* Day of *December 1978*

[SEAL]

Attest:

RUTH C. MASON
*Attesting Officer*

DONALD W. BANNER
*Commissioner of Patents and Trademarks*